United States Patent
De Michele (10) Patent No.: US 10,372,223 B2
(45) Date of Patent: Aug. 6, 2019

(54) METHOD FOR PROVIDING USER COMMANDS TO AN ELECTRONIC PROCESSOR AND RELATED PROCESSOR PROGRAM AND ELECTRONIC CIRCUIT

(71) Applicant: NU-TECH SAS DI DE MICHELE MARCO & C., Bergamo (IT)

(72) Inventor: Marco De Michele, Bergamo (IT)

(73) Assignee: NU-TECH SAS DI MICHELE MARCO & C., Bergamo (IT)

(*) Notice: Subject to any disclaimer, the term of this patent is extended or adjusted under 35 U.S.C. 154(b) by 0 days.

(21) Appl. No.: 15/105,564

(22) PCT Filed: Dec. 17, 2014

(86) PCT No.: PCT/EP2014/078206
§ 371 (c)(1),
(2) Date: Jun. 17, 2016

(87) PCT Pub. No.: WO2015/091638
PCT Pub. Date: Jun. 25, 2015

(65) Prior Publication Data
US 2016/0320846 A1    Nov. 3, 2016

(30) Foreign Application Priority Data

Dec. 18, 2013 (IT) .............................. CO2013A0068

(51) Int. Cl.
*G06F 3/01* (2006.01)
*G06F 3/03* (2006.01)
(Continued)

(52) U.S. Cl.
CPC ............ *G06F 3/017* (2013.01); *G06F 3/0304* (2013.01); *G06F 3/04815* (2013.01); *G06K 9/00355* (2013.01); *G06K 9/00375* (2013.01)

(58) Field of Classification Search
CPC .... G06F 3/017; G06F 3/0304; G06F 3/04815; G06K 9/00355; G06K 9/00375
See application file for complete search history.

(56) References Cited

U.S. PATENT DOCUMENTS

2002/0140667 A1  10/2002  Toshio
2008/0005703 A1  1/2008  Radivojevic et al.
(Continued)

FOREIGN PATENT DOCUMENTS

GB     2 477 044       7/2011
WO     WO 1999/65014   12/1999
WO     WO 2009/128064  10/2009

OTHER PUBLICATIONS

PCT/EP2014/078206, Mar. 31, 2015, International Search Repot and Written Opinion.

*Primary Examiner* — Ariel A Balaoing
(74) *Attorney, Agent, or Firm* — Workman Nydegger (57) ABSTRACT

It is disclosed a method for providing user commands to an electronic processor, wherein a first command corresponds to the pressure of a first predetermined button of a mouse and a second command corresponds to the release of the button. An image detection device in communication with the electronic processor is able to detect a sequence of images of a person using the electronic processor. The method comprises the following steps: A) identifying a hand of the person; B) detecting movement of the hand corresponding to pinching of the pad of the thumb and of the pad of another finger; C) generating the first user command and sending it to the electronic processor; D) detecting movement of the hand corresponding to spreading of the pad of the thumb and of the pad of the other finger; E) generating the second user command and sending it to the electronic processor.

19 Claims, 3 Drawing Sheets

(51) Int. Cl.
*G06K 9/00* (2006.01)
*G06F 3/0481* (2013.01)

(56) References Cited

U.S. PATENT DOCUMENTS

| | | | | |
|---|---|---|---|---|
| 2008/0036732 | A1* | 2/2008 | Wilson | G06F 3/017 345/156 |
| 2009/0284469 | A1* | 11/2009 | Hsieh | G06F 1/1626 345/158 |
| 2010/0045666 | A1* | 2/2010 | Kornmann | G06F 1/1626 345/419 |
| 2010/0117963 | A1* | 5/2010 | Westerman | G06F 3/03543 345/163 |
| 2011/0102570 | A1* | 5/2011 | Wilf | G06F 3/017 348/77 |
| 2011/0119638 | A1* | 5/2011 | Forutanpour | G06F 3/03542 715/863 |
| 2011/0181553 | A1 | 7/2011 | Brown et al. | |
| 2012/0001875 | A1* | 1/2012 | Li | G01S 7/5273 345/177 |
| 2012/0113241 | A1* | 5/2012 | Sundaresan | G06F 3/017 348/77 |
| 2012/0207345 | A1* | 8/2012 | Tang | G06F 3/017 382/103 |
| 2012/0249417 | A1* | 10/2012 | Cho | G06F 3/017 345/156 |
| 2013/0076507 | A1* | 3/2013 | Petricoin, Jr. | H04N 7/14 340/539.11 |

* cited by examiner

METHOD FOR PROVIDING USER COMMANDS TO AN ELECTRONIC PROCESSOR AND RELATED PROCESSOR PROGRAM AND ELECTRONIC CIRCUIT

BACKGROUND

Technical Field

The present disclosure relates to a method for providing user commands to an electronic processor and related processor program and electronic circuit.

Description of the Related Art

An electronic processor essentially consists of a processor, memory and a user interface. Typically, the interface output device is a screen and the user interface input device is a keyboard, i.e. an alphanumerical input device. Almost always, there is a second user interface device dedicated to the "cursor (graphic)" and to its movement on the screen, i.e. a graphic input device; often, this graphic device is a "mouse"; in the case of portable electronic processors ("laptops"), this graphic device is a "touchpad" or a "pointing stick".

Currently, the use of "tablets" is rapidly becoming increasingly widespread; in these devices the screen, which is of "touchscreen" type, acts both as user interface output device and as alphanumerical and graphic user interface input device.

Moreover, as known, there are many electronic devices that integrate electronic processors adapted to interact with their users; this is the case, for example, of "smart phones".

BRIEF SUMMARY

The present inventor realized that, in many situations, the current graphic user interface input devices are not completely satisfactory; for example, a "mouse" is provided but there is no surface on which to move it adequately, a "touchpad" or "touchscreen" is provided, but it is too small and therefore awkward to use or the user is wearing gloves and therefore is unable to use it.

Naturally, there are also situations in which no graphic user interface input device is provided, but there is the need for one.

It is undeniable that the "mouse" is a very practical device to use.

Therefore, the present inventor set himself the objective of emulating a "mouse" by means of other devices, thereby attempting to overcome the problems indicated above.

Therefore, the present inventor decided to perform this emulation by means of an image detection device.

Operation of a "mouse" has two fundamental aspects; translation of its body and operation of its buttons (there are often two buttons, even if there are mice with only one button and with more than two buttons).

The method according to the disclosure having the characteristics set down in the appended claims enables a "mouse" to be completely emulated, even if, in the first instance, it concentrates on operation of the buttons.

Emulation takes place by means of (automatic) visual detection of gestures of the hand, in particular movements of the fingers.

The present inventor has identified gestures that are easy to perform, that can be performed in a small space and, above all, that can be reliably detected, in particular by means of a method conceived by him.

In this way, the user commands typically provided to an electronic processor by means of a "mouse" do not require this device or even a "touchpad" or a "touchscreen" to be touched. It should be noted that, due to the specific mode in which the "mouse" has been emulated, "drag & drop" functions can also be performed.

BRIEF DESCRIPTION OF THE SEVERAL VIEWS OF THE DRAWINGS

The present disclosure will be more apparent from the following detailed description, which should be considered together with the accompanying drawings, wherein.

Both this description and these drawings must be considered purely for illustrative purposes and therefore not limiting.

DETAILED DESCRIPTION

As can be easily understood, there are various modes of practical implementation and of application of the present disclosure, which is defined in its main advantageous aspects in the appended claims.

Figure 1:
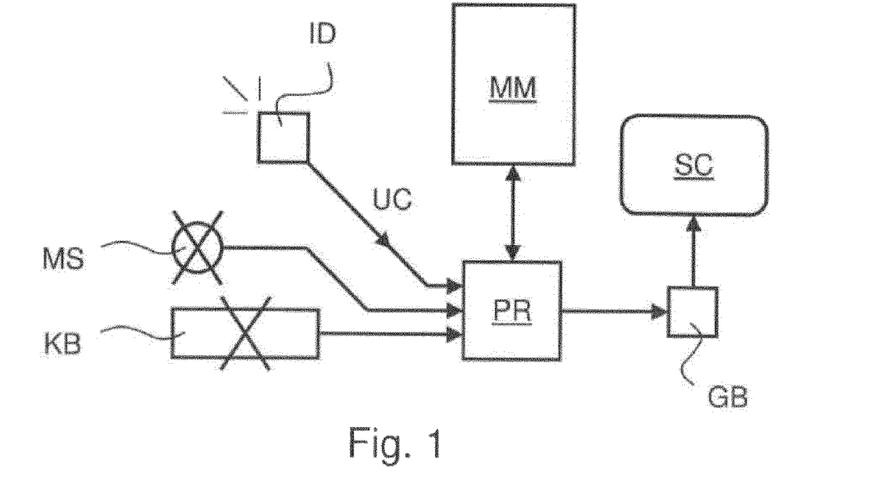
FIG. 1 shows a greatly simplified block diagram of an electronic circuit adapted to implement a method according to the present disclosure.

The electronic circuit of FIG. 1 is adapted to implement the method according to the present disclosure; it comprises a processor PR (for example a microprocessor), a memory MM (for example all the memory devices of ROM, and/or EPROM and/or RAM and/or FLASH type) connected to the processor PR.

Moreover, a screen SC is provided connected to the processor PR by means of a graphics card GB, and a "mouse" MS and a "keyboard" KB are connected to the processor PR, but, as already stated and as will be more apparent below, the "mouse" and/or "keyboard" could also be omitted.

Finally, an image detection device ID is provided, on which the method according to the present disclosure is based; this device could be a digital camera, a digital video camera (for example a "webcam"), or a more specialized device, such as the "Leap Motion Controller". Is should be noted that, for the purposes of the present disclosure, the images detected by the device ID could be in the visible range, in the infrared or in another range, provided that they enable the position of the fingers of one or both hands to be identified with reasonable precision; also with regard to the quality of the images, what matters is that the spatial position of the fingers, i.e. the position in the three-dimensional space, can be identified with reasonable precision.

Conceptually, the device ID provides the electronic processor with user commands UC; this is possible due to the method according to the present disclosure; otherwise, the device ID would provide the electronic processor with image information.

The method according to the present disclosure will be described in details with the aid of the accompanying figures.

In the first instance, the method according to the present disclosure is used to provide user commands to an electronic processor; a first user command corresponds to the pressure of a first predetermined button of a "mouse" and a second user command corresponds to the release of said first predetermined button.

As stated, the method provides for the use of an image detection device in communication (with or without a cable) with the electronic processor and adapted to detect a sequence of images of a person using the electronic processor (in particular of one or of both of this person's hands).

The method comprises the following steps in sequence:
A) identifying a hand (for example HN in FIG. 2 and FIG. 3) of the person,
B) detecting movement of the hand (for example HN in FIG. 2) corresponding to pinching (see arrows in FIG. 2) of the pad of the thumb (for example FA in FIG. 2) and of the pad of a first predetermined other finger (for example FB in FIG. 2),
C) generating the first user command and sending it to the electronic processor,
D) detecting movement of the hand (for example HN in FIG. 3) corresponding to spreading (see arrows in FIG. 3) of the pad of the thumb (for example FA in FIG. 3) and of the pad of the other finger (for example FB in FIG. 3),
E) generating the second user command and sending it to the electronic processor.

The movements of thumb and index finger are the movements of the fingers of the hand that are easiest to perform and to detect and therefore will typically be associated with the main "mouse" button, i.e., in the case of two buttons, the left button.

Step C starts when the "pinch" movement is considered sufficient; this condition will be explained in more detail below.

Step E starts when the "spread" movement is considered sufficient; this condition will be explained in more detail below.

It should be noted that although the description of the method according to the present disclosure concentrates on movements of only one hand, it may be useful and advantageous to consider the movements of both hands in sequence or simultaneously. For example, the cursor could be moved through gestures of the left hand and the buttons of the "emulated mouse" could be operated through gestures of the right hand; moreover, two "mice" could be emulated by detecting the movements of the two hands of a single user or the movements of one hand of a first user and the movements of one hand of a second user.

To emulate "mice" with several buttons, the movements of other fingers could be used.

For the second "mouse" button, i.e. the right one in the case of two buttons, it is preferable to consider thumb and middle finger, but in entirely the same way as described and illustrated above in relation to thumb and index finger.

For other buttons of the "mouse", thumb and ring finger and thumb and little finger can, for example, be considered.

Alternatively, pinching and spreading of thumb and middle finger and/or pinching and spreading of thumb and ring finger and/or pinching and spreading of thumb and little finger can be used to send user commands of another type to the electronic processor. These user commands of other type can be fixed and predetermined or variable (in relation to the context of application) and predetermined or programmable (for example by the user of the electronic processor).

Therefore, according to the present disclosure, it is advantageous to simultaneously monitor the movements of several fingers of the hand.

Figure 2:
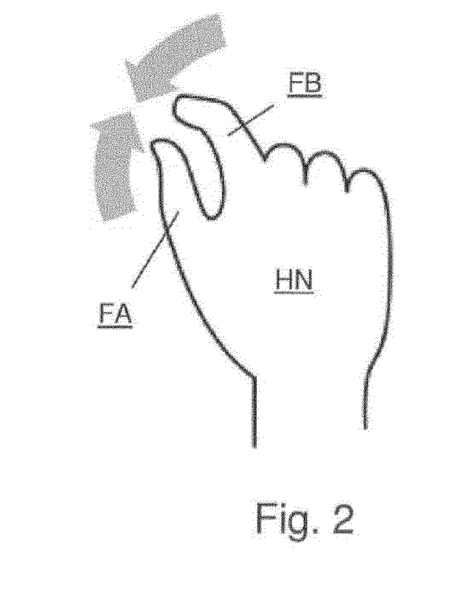
FIG. 2 schematically shows a first movement of the hand on which the emulation of the operation of a button of a "mouse" is based.
Figure 3:
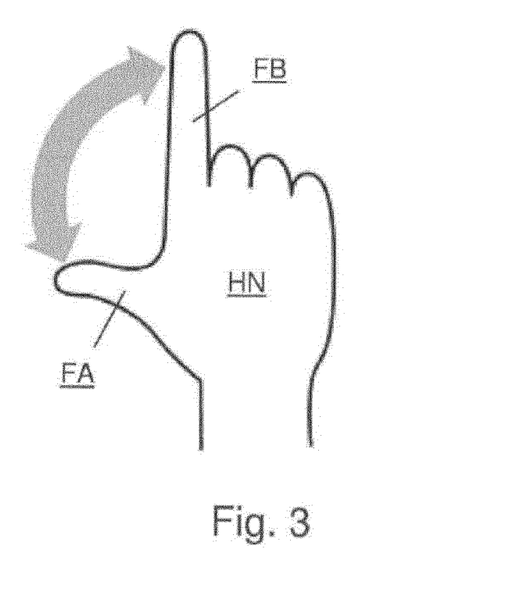
FIG. 3 schematically shows a second movement of the hand on which the emulation of the operation of a button of a "mouse" is based.
Figure 4:
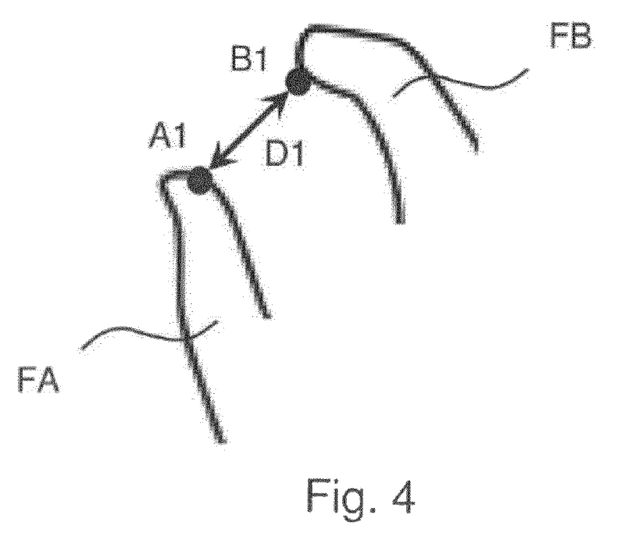
FIG. 4 shows a position of the thumb and of the index finger of a hand used to explain a method according to the present disclosure.

FIG. 4 shows a first finger FA, in particular the thumb, and a second finger FB, in particular the index finger, of the hand HN shown in FIG. 2 and FIG. 3 in a given reciprocal position at an instant I1. A point A1 corresponds substantially to the centre of the pad of the finger FA and a point B1 corresponds substantially to the centre of the pad of the finger FB; alternatively, reference could be made to points corresponding substantially to the tips of the fingers. A distance D1 is thus identified between the points A1 and B1, which can be called "distance between the fingers".

Figure 5:
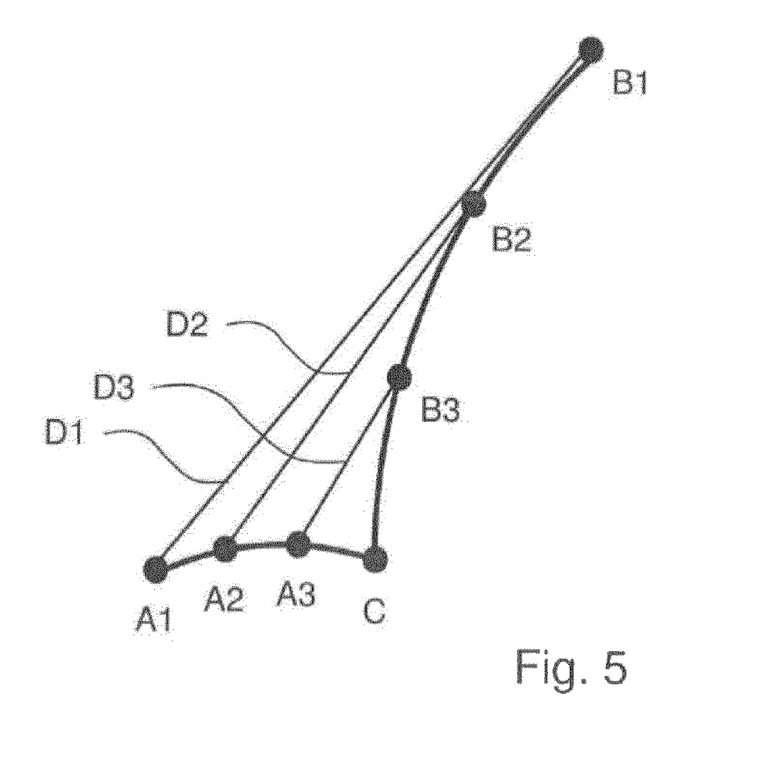
FIG. 5 schematically shows a movement of the thumb and of the index finger of a hand in relation to a method according to the present disclosure.

FIG. 5 schematizes a pinching movement of the fingers FA and FB starting from the position of FIG. 4. A trajectory is shown, starting from the point A1 and ending at the point C relating to the finger FA; it is a curved trajectory (purposely exaggerated) as a finger tends to make a rotational movement. A trajectory is shown starting from the point B1 and ending at the point C relating to the finger FB; it is a curved trajectory (purposely exaggerated) as a finger tends to make a rotational movement. The two trajectories end in the same point C as it was assumed that, at a given instant I4, the centre of the pad of the finger FA comes into contact with the centre of the pad of the finger FB. A point A1 of the finger FA, a point B1 of the finger FB and a distance D1 between finger FA and finger FB is identified at the instant I1. A point A2 of the finger FA, a point B2 of the finger FB and a distance D2 between finger FA and finger FB is identified at the instant I2 (subsequent to the instant I1). A point A3 of the finger FA, a point B3 of the finger FB and a distance D3 between finger FA and finger FB is identified at the instant I3 (subsequent to the instant I2). A point C common to the finger FA and to the finger FB and a zero distance between finger FA and finger FB is identified at the instant I4 (subsequent to the instant I3).

Figure 6:
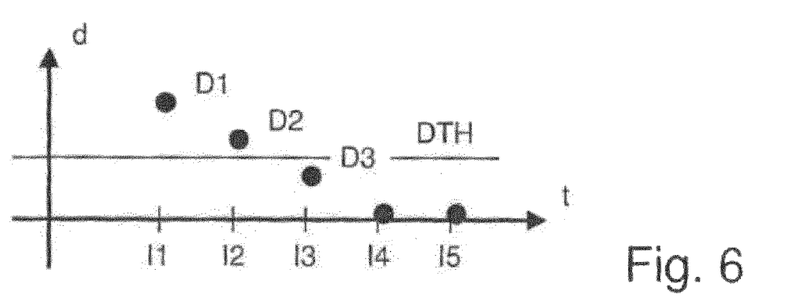
FIG. 6 shows the trend of the distance between thumb and index finger for the movement of FIG. 5.

The graph of FIG. 6 represents the distance "d" (between finger FA and finger FB) as a function of the time "t" in a series of subsequent instants from I1 to I5; it was assumed, purely for the sake of simplicity, that the delay between the various instants is constant.

Figure 7:
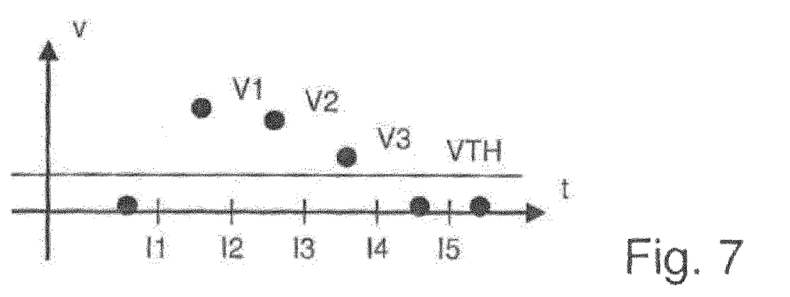
FIG. 7 shows the trend of the pinch speed between thumb and index finger for the movement of FIG. 5.

The graph of FIG. 7 represents the pinch speed "v" (between finger FA and finger FB) as a function of the time "t"; the pinch speed was calculated as difference of two distances in two subsequent instants divided by the delay between the two subsequent instants; for this reason the speeds are represented in intermediate points between the instants; this movement was assumed to start from two fingers not moving (zero speed) and to end with two fingers not moving (zero speed).

In an embodiment of the method according to the present disclosure, a third user command corresponds to the pressure of a second predetermined button of a "mouse" and a fourth user command corresponds to the release of said second predetermined button, and the method comprises, after Step A) the further steps of:
F) detecting movement of said hand corresponding to pinching of the pad of the thumb of said hand and of the pad of a second predetermined other finger of said hand, G) generating a third user command and sending it to said electronic processor, H) detecting movement of said hand corresponding to spreading of the pad of the thumb of said hand and of the pad of said second predetermined other finger of said hand, I) generating a fourth user command and sending it to said electronic processor.

To detect the gestures of the hand, the movements of the hand within time intervals must be considered; these time intervals can be defined, for example, in terms of temporal duration or in terms of number of images of the hand received by the detection device.

According to the present disclosure, detection of the movement of the hand corresponding to pinching of two fingers typically comprises comparison of the distance between the two fingers and a pinch threshold distance; in FIG. 6 this threshold distance is indicated with DTH. In particular, the DTH is an adaptive threshold distance which can be adapted, for instance, to the sizes of different hands, to the variations of the "frame rate", and similar variable parameters. According to the present disclosure, detection of the movement of the hand corresponding to spreading of two fingers typically comprises comparison of the distance between the two fingers and a spread threshold distance that is an adaptive threshold distance which can be adapted, for instance, to the sizes of different hands, to the variations of the "frame rate", and similar variable parameters. The pinch threshold distance and the spread threshold distance will generally be different. With reference to FIG. 6, at the instant I3 the fingers FA and FB are considered sufficiently pinched and therefore the user command corresponding to pressing of the mouse button can be sent.

In one embodiment, according to the present disclosure detection of the movement of the hand corresponding to pinching or spreading of two fingers can comprise comparison of the pinch or spread speed of the two fingers with at least one threshold speed; a pinch threshold speed (indicated with VTH in FIG. 7) and a spread threshold speed, or a single threshold speed, can be provided. With reference to FIG. 7, for a given time interval the speed is high and then drops below the threshold.

In one embodiment, according to the present disclosure detection of the movement of the hand corresponding to pinching or spreading of two fingers can comprise checking the monotonicity of the movement; for example, with reference to FIG. 6, in the time interval ranging from I1 to I4 or from I1 to I5 there is progressive and monotone pinching of the fingers.

In one embodiment, according to the present disclosure in order to reduce detection errors it is useful to simultaneously monitor the movements of several fingers and to compare them; for example, when the index finger moves the middle finger also moves and when the middle finger moves the index finger also moves, and so forth for all the fingers.

The checks described above can be combined with one another in various different ways for more reliable detection of gestures. For example, considering FIG. 6 and FIG. 7, it could be considered that pinching of the fingers is sufficient only if the distance is below the threshold and the pinch speed is below the threshold, i.e. from the instant I5 on.

Figure 8:
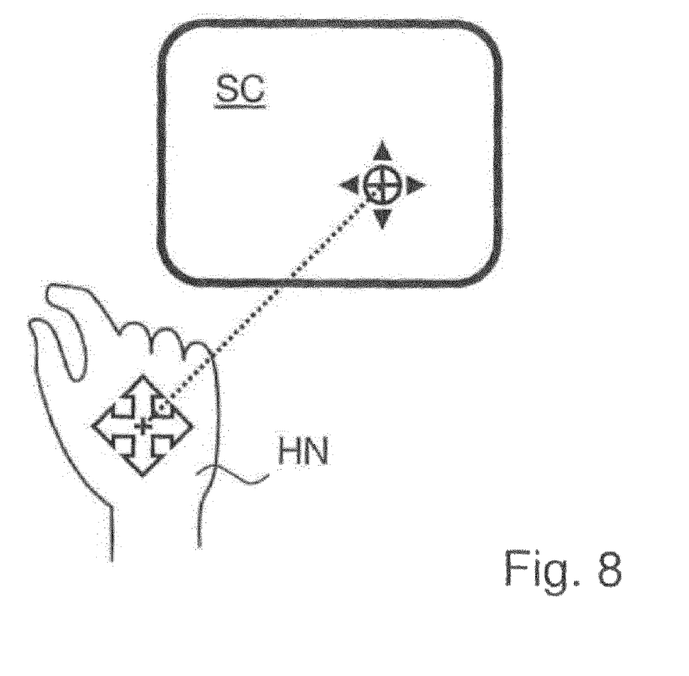
FIG. 8 schematically shows movements of the hand on which the emulation of the translations of a "mouse" and of the consequent translations of the "cursor" are based.

With regard to emulation of translation of the body of the "mouse", the present disclosure optionally provides for:

J) detecting movements of the hand (for example HN in FIG. 8) corresponding to translations (see arrows in FIG. 8) of the palm of the hand, and simultaneously generating corresponding user commands and sending them to the electronic processor—the user commands corresponding to translations of the "cursor" on the screen (for example SC in FIG. 8) of the electronic processor.

As the movements of the palm of the hand cannot correspond exactly to translations in the geometrical sense of this term, regardless of how hard the user tries to achieve these, the movements of the palm must be processed and assimilated as much as possible to translations.

Moreover, in order to completely emulate the characteristics of use of a "mouse" the method according to the present disclosure also provides the possibility for the user to "lift and reposition the mouse on the pad". This feature allows the user to reposition the hand centrally with respect to the field of view of the detection device ID, so as to allow the user to find the most comfortable position, or where the detection device ID works best, regardless of position the cursor on the screen which, during the lifting of the "mouse", is maintained unchanged.

According to this embodiment of the present disclosure, the "lifting of the mouse" operation can be detected by recognition of a first predetermined kind of movement of the hand and/or fingers. For instance, the hand movement associated with "lifting of the mouse" operation can be the closing of the hand into a fist. In such a case, the movement can be recognized algorithmically by considering the angles formed between the metacarpal bone and the proximal phalanx and between the proximal phalanx and middle phalanx as well as the angles formed between the metacarpal bone and the proximal phalanx and between the proximal and distal phalanx. If the mean value of these angles, is below a certain threshold, then the gesture is recognized and associated with the "lifting of the mouse" operation.

Thus, according to this embodiment, the present disclosure optionally provides for:

J1) detecting movements of the hand corresponding to a first predetermined kind of movement of the hand and/or fingers and simultaneously generating corresponding user commands and sending them to the electronic processor—the user commands corresponding to maintaining fixed the position of the "cursor" on the screen of the electronic processor, while the hand is repositioned ("lift and reposition the mouse on the pad" operation).

With regard to emulation of rotation of the "wheel" of the "mouse", the present disclosure optionally provides for:

K) detecting movements of the hand corresponding to rotations of one of the fingers of the hand, and simultaneously generating corresponding user commands and sending them to the electronic processor—the user commands corresponding to rotations of the "wheel".

As the movements of a finger of the hand cannot correspond exactly to rotations in the geometrical sense of this term, regardless of how hard the user tries to achieve these, the movements of the finger must be processed and assimilated as much as possible to rotations.

Therefore, according to the present disclosure it is advantageous to simultaneously monitor many or all the movements of a hand or of both hands; for example, by simultaneously monitoring both the fingers and the palm of the hand it is possible to produce the "drag & drop" function.

The method according to the present disclosure can also be implemented for the control of an electronic processor (PR+MM+SC) having three-dimensional graphical user interfaces in which a display provides three-dimensional virtual spaces, whether they are 3D screens or visors wearable by the user (e.g. goggles or glasses or masks or similar devices). In such a case, emulation of movement of the body of the "mouse" takes place as described above, but considering translations of both the palm and the cursor in a three-dimensional space, so as to allow consequently the user of the present disclosure to carry out all the gestures described inside a three dimensional space, thus allowing to operate within the so-called virtual reality applications.

The method according to the present disclosure can be applied in one embodiment to all devices in which an electronic processor is integrated, such as, purely by way of non-limiting but advantageous example, "smart phones" (typically equipped with "touchscreens") and "tablets" (equipped with "touchscreens"); the image detection device can be integrated directly inside the "smart phone" or the "tablet".

The method according to the present disclosure can be implemented in the form of processor program (firmware), be loaded into the image detection device and be executed directly by the device.

Alternatively, the method according to the present disclosure can be implemented in the form of processor program (software), be loaded into the electronic processor and be executed by the processor. For example, in the case of a "smart phone" or of a "tablet", it could be an "APP". For example in the case of a "desktop" computer, it could be an application that runs in the background.

The method according to present disclosure can also be implemented in the form of electronic circuit (hardware), for example through a device of FPGA type or a dedicated PCB.

A specific implementation of the present disclosure to emulate a "mouse" provided with two "buttons" and one "wheel" will be described in detail below.

This implementation is based on a specialized image detection device, for example the "Leap Motion Controller", which cyclically sends high level spatial information, in particular three-dimensional spatial information, relating to the hand (for example number of hands recognized and respective ID of each hand, number of fingers recognized for each hand recognized and respective ID of each finger, three-dimensional position of the centre of the palm of each hand recognized, unit vector perpendicular to the plane formed by the palm of the hand with outgoing direction from the palm, position of the pad of each finger recognized, speed of the pad of each finger recognized, for each finger recognized unit vector with direction corresponding to the longitudinal extension of the finger and with outgoing direction from the finger, any circular movements of pads of the fingers recognized of the hands recognized); this device is able to identify and track the fingers (if and when they are seen by the device) and to associate them with a unique identification code.

Each time the device sends information (and consequently the electronic processor receives it)—generally these are "frames"—a series of processing steps, in particular ten processing steps, are executed.

It must be noted that the "frame rate" is variable (typically it ranges from 20 frames per second to 200 frames per second—this datum is part of the frame data) and therefore the processing steps must take account of this variability when calculating, for example, the pinch speed of two fingers or the movement speed of the palm of the hand.

The algorithm consisting of all these steps provides for the use of a plurality of information codes to memorize, at each "frame", high level spatial information relating to the hand partly received from the device and partly calculated during execution of the steps of this algorithm.

As will be better understood below, the algorithm uses adaptive thresholds to adapt, for example, to the sizes of different hands, to the variations of the "frame rate", etc.

Step 1
1 move the cursor only if a number of fingers greater than a minimum number has been identified or the user has performed a "left click" and is not using the "wheel"
1.1 obtain from the device the normalized position of the palm
1.2 calculate the position of the cursor on the screen, applying the normalized position of the palm (see step 1.1) to the screen resolution
1.3 add the position of the cursor to an information code
1.4 move the cursor to the position calculated
1.5 obtain from the device the unit vector normal to the palm
1.6 add the unit vector normal to the palm to an information code
1.7 calculate mean and standard deviation of the unit vector normal to the palm Step 2
2 recognize the fingers only if the fingers that the device is tracking are greater in number than a minimum number
2.1 classify the hand as "right hand" or "left hand" based on the unit vector normal to the palm of the hand
2.2 classify the fingers ("thumb", "index finger", "middle finger", "ring finger", "little finger") based on the coordinates of the positions of the pads (taking into account that the spatial order of the fingers derives from physiological constraints)

Step 3
3 calculate the distance between the position of the index finger and the palm and the distance between the position of the middle finger and the palm and add both to two information codes Step 4
4 calculate the movement of the hand (specifically the speed of the palm)

Step 5
5 if the movement of the hand is below a maximum speed and the distance between the position of the index finger and the palm is above a minimum distance and the distance between the position of the middle finger and the palm is above a minimum distance, then the movement of the hand calculated previously is reset to zero
(Step 5 is optional and is used to perform Steps 8 and 9 even if the hand is moving relatively, but not excessively, fast)

Step 6
6 perform the present step only if the movement of the hand is below a maximum speed
6.1 calculate the distance between the position of index finger and thumb and add it to an information code
6.2 calculate the distance between the position of middle finger and thumb and add it to an information code
6.3 calculate minimum, maximum, mean and standard deviation (statistical data) of the index finger-thumb and middle finger-thumb distances present in the respective information codes
6.4 based on the statistical data of step 6.3, calculate an adaptive threshold for the index finger-thumb and middle finger-thumb distances (see Steps 8 and 9)

Step 7
7 obtain from the device the speed of the index finger and the speed of the middle finger, calculate the angle formed between the vector extending from the index finger and the unit vector normal to the palm, calculate the angle formed between the vector extending from the middle finger and the unit vector normal to the palm, and add them to an information code Step 8

8 prepare for recognition of the gestures of index finger and thumb 8.1 if the distance between the position of index finger and thumb is below the adaptive threshold (see step 6.4) and the event "index finger-thumb pinch" is not active and the number of fingers currently tracked by the device is greater than a minimum number and the movement of the hand is below a high speed proceed, otherwise go to Step 8.2

8.1.1 if the distance between the position of index finger and thumb has decreased monotonically for a given number of frames proceed, otherwise go to Step 8.2

8.1.1.1 calculate the pinch speed of index finger and thumb in the time corresponding to the number of frames of Step 8.1.1

8.1.1.2 if the speed calculated in Step 8.1.1.1 is greater than a minimum speed proceed, otherwise go to Step 8.2

8.1.1.2.1 if the speed of the index finger is greater than the speed of the middle finger and/or the angle between index finger and palm is below the angle between middle finger and palm proceed, otherwise go to Step 8.2

8.1.1.2.1.1 activate the event "index finger-thumb pinch" and generate the user command "press left mouse button"

8.2 if the distance between the position of index finger and thumb is greater than the adaptive threshold (see step 6.4) multiplied by a given reduction factor and the event "index finger-thumb pinch" is active and the number of fingers currently tracked by the device is greater than a minimum number and the movement of the hand is below a high speed proceed, otherwise go to Step 9

8.2.1 if the distance between the position of index finger and thumb has increased monotonically for a given number of frames proceed, otherwise go to Step 9

8.2.1.1 calculate the spread speed of index finger and thumb in the time corresponding to the number of frames of Step 8.2.1

8.2.1.2 if the speed calculated in Step 8.2.1.1 is greater than a minimum speed proceed, otherwise go to Step 9

8.2.1.2.1 if the speed of the index finger is greater than the speed of the middle finger and/or the angle between index finger and palm is below the angle between middle finger and palm proceed, otherwise go to Step 9

8.2.1.2.1.1 deactivate the event "index finger-thumb pinch" and generate the user command "release left mouse button"

Step 9 (Very Similar to Step 8)

9 prepare for recognition of the gestures of middle finger and thumb 9.1 if the distance between the position of middle finger and thumb is below the adaptive threshold (see Step 6.4) and the event "middle finger—thumb pinch" is not active and the number of fingers currently tracked by the device is greater than a minimum number and the movement of the hand is below a high speed proceed, otherwise go to Step 9.2

9.1.1 if the distance between the position of middle finger and thumb has decreased monotonically for a given number of frames proceed, otherwise go to Step 9.2

9.1.1.1 calculate the pinch speed of middle finger and thumb in the time corresponding to the number of frames of Step 9.1.1

9.1.1.2 if the speed calculated in Step 9.1.1.1 is greater than a minimum speed proceed, otherwise go to Step 9.2

9.1.1.2.1 if the speed of the middle finger is greater than the speed of the index finger and/or the angle between middle finger and palm is below the angle between index finger and palm proceed, otherwise go to Step 9.2

9.1.1.2.1.1 activate the event "middle finger-thumb pinch" and generate the user command "press right mouse button"

9.2 if the distance between the position of middle finger and thumb is greater than the adaptive threshold (see step 6.4) multiplied by a given reduction factor and the event "middle finger-thumb pinch" is active and the number of fingers currently tracked by the device is greater than a minimum number and the movement of the hand is below a high speed proceed, otherwise go to Step 10

9.2.1 if the distance between the position of middle finger and thumb has increased monotonically for a given number of frames proceed, otherwise go to Step 10

9.2.1.1 calculate the spread speed of middle finger and thumb in the time corresponding to the number of frames of Step 9.2.1

9.2.1.2 if the speed calculated in Step 9.2.1.1 is greater than a minimum speed proceed, otherwise go to Step 10

9.2.1.2.1 if the speed of the middle finger is greater than the speed of the index finger and/or the angle between middle finger and palm is below the angle between index finger and palm proceed, otherwise go to Step 10

9.2.1.2.1.1 deactivate the event "middle finger-thumb pinch" and generate the user command "release right mouse button"

Step 10

10 obtain from the device if a finger is moved along a substantially circular trajectory 10.1 if the circular movement occurs in clockwise direction and the extent of the rotation is greater than a minimum rotation proceed to Step 10.1.1, otherwise skip Step 10.1.1

10.1.1 generate the user command "rotate mouse wheel" specifying "forward rotation" and "extent of rotation=extent of finger rotation"

10.2 if the circular movement occurs in counter-clockwise direction and the extent of the rotation is greater than a minimum rotation proceed to Step 10.2.1, otherwise skip Step 10.2.1

10.2.1 generate the user command "rotate mouse wheel" specifying "backward rotation" and "extent of rotation=extent of finger rotation"

(Step 10 is optional and its only purpose is to emulate the "wheel" of the "mouse"—the "Leap Motion Controller" device greatly facilitates implementation of this step, as the gesture of rotation of the pad of a finger is recognized by this device)

The invention claimed is:

1. A method for providing user commands to an electronic processor, wherein a first user command corresponds to a pressure of a first predetermined button of a "mouse" and a second user command corresponds to a release of said first predetermined button, the method comprising the following steps in sequence:

A) identifying a hand of said person with an image detection device in communication with the electronic processor, wherein the image detection device is configured to detect a sequence of images of said hand using the electronic processor, B) detecting movement of said hand corresponding to pinching of a pad of a thumb of said hand and of a pad of a first predetermined other finger of said hand from said sequence of images, said detection including identifying and tracking the thumb and the first predetermined other finger, said detection of the pinching movement further including identifying a tracked distance between the pad of the thumb and the pad of the first predetermined other finger at subsequent instants;

C) generating said first user command and sending said first command to said electronic processor, D) detecting movement of said hand corresponding to spreading of the pad of the thumb of said hand and of the pad of said first predetermined other finger of said hand from said sequence of images, said detection of the spreading movement including identifying a tracked distance between the pad of the thumb and the pad of the first predetermined other finger at subsequent instants, and E) generating said second user command and sending said second user command to said electronic processor.

2. The method according to claim 1, wherein a third user command corresponds to a pressure of a second predetermined button of the "mouse" and a fourth user command corresponds to the release of said second predetermined button, comprising, after Step A) the further steps of:

F) detecting movement of said hand corresponding to pinching of the pad of the thumb of said hand and of a pad of a second predetermined other finger of said hand based on the sequence of images, G) generating a third user command and sending the third user command to said electronic processor, H) detecting movement of said hand corresponding to spreading of the pad of the thumb of said hand and of the pad of said second predetermined other finger of said hand, I) generating a fourth user command and sending said fourth user command to said electronic processor.

3. The method according to claim 1, wherein detection of the movement of the hand corresponding to pinching and spreading of the pad of the thumb and the pad of the first predetermined other finger comprises a comparison of the tracked distance between the pad of the thumb and the pad of the first predetermined other finger with a pinch threshold distance and with a spread threshold distance, respectively.

4. The method according to claim 2, wherein detection of the movement of the hand corresponding to pinching or spreading of the pad of the thumb and the pad of the second predetermined other finger comprises a comparison of a distance between said two fingers of the hand with a pinch threshold distance or a spread threshold distance.

5. The method according to claim 1, wherein detection of the movement of the hand corresponding to pinching or spreading of the pad of the thumb and the pad of the first predetermined other finger comprises a comparison of a pinch speed or a spread speed of the pad of the thumb and the pad of the first predetermined other finger with at least one threshold speed and checking of a monotonicity of the movement.

6. The method according to claim 2, wherein detection of the movement of the hand corresponding to pinching or spreading of the pad of the thumb and the pad of the second predetermined other finger comprises a comparison of a pinch speed or a spread speed of the pad of the thumb and the pad of the second predetermined other finger with at least one threshold speed and checking of a monotonicity of the movement.

7. The method according to claim 3, wherein detection of the movement of the hand corresponding to pinching or spreading of the pad of the thumb and the pad of the first predetermined other finger comprises comparison of a pinch speed or a spread speed of the pad of the thumb and the pad of the first predetermined other finger with at least one threshold speed and checking of a monotonicity of the movement.

8. The method according to claim 4, wherein detection of the movement of the hand corresponding to pinching or spreading of the pad of the thumb and the pad of the second predetermined other finger comprises a comparison of a pinch speed or a spread speed of the pad of the thumb and the pad of the second predetermined other finger with at least one threshold speed and checking of a monotonicity of the movement.

9. The method according to claim 1, comprising, after step A, the further steps of:

J) detecting movements of said hand corresponding to translations of a palm of said hand, and simultaneously generating corresponding user commands and sending the corresponding user commands to said electronic processor, said user commands corresponding to translations of said "cursor" on a screen of said electronic processor.

10. The method according to claim 1, comprising, after step A, the further steps of:

J1) detecting movements of said hand corresponding to a first predetermined kind of movement of the hand and/or fingers and simultaneously generating corresponding user commands and sending the corresponding user commands to the electronic processor, the user commands corresponding to maintaining fixed the position of the "cursor" on the screen of the electronic processor, while the hand is repositioned.

11. The method according to claim 10, wherein said first predetermined kind of movement of the hand and/or fingers is a closing of the hand into a fist.

12. The method according to claim 1, comprising, after step A, the further steps of:

K) detecting movements of said hand corresponding to rotations of one of the fingers of said hand, and simultaneously generating corresponding user commands and sending the corresponding user commands to said electronic processor, said user commands corresponding to rotations of a "wheel" of said "mouse".

13. The method according to claim 1, wherein said electronic processor comprises a three-dimensional graphical user interface.

14. The method according to claim 1, wherein said electronic processor is part of a "smart phone" or a "tablet", and said image detection device is integrated inside the "smart phone" or the "tablet".

15. A non-transitory processor program adapted to perform the steps of the method according to claim 1, when said processor program is run on the image detection device.

16. A non-transitory processor program adapted to perform the steps of the method according to claim 1, when said processor program is run on an electronic processor of a smartphone or of a tablet.

17. An electronic circuit adapted to perform the steps of the method according to claim 1.

18. Method according to claim 1, wherein in step B) the pinching includes the contact of the pad of the thumb with the pad of the first predetermined other finger.

19. A method for providing user commands to an electronic processor, wherein a first user command corresponds to a pressure of a first predetermined button of a "mouse" and a second user command corresponds to the release of said first predetermined button, the method comprising the following steps in sequence, A) identifying a hand of said person with an image detection device in communication with the electronic processor, wherein the image detection device is configured to detect a sequence of images of said hand using the electronic processor;
B) detecting movement of said hand corresponding to pinching of a pad of a thumb of said hand and of a pad of a first predetermined other finger of said hand from said sequence of images, said detection including identifying and tracking the thumb and the first predetermined other finger, said detection of the pinching movement further including a comparison of a decreasing distance between the pad of the thumb and the pad of the first predetermined other finger with a pinch threshold distance at subsequent instants;
C) generating said first user command and sending said first command to said electronic processor;
D) detecting movement of said hand corresponding to spreading of the pad of the thumb of said hand and of the pad of said first predetermined other finger of said hand from said sequence of images, said detection of the spreading movement further including a comparison of an increasing distance between the pad of the thumb and the pad of the first predetermined other finger with a spread threshold distance at subsequent instants;
E) generating said second user command and sending said second user command to said electronic processor.

* * * * *